US 10,743,561 B2

(12) United States Patent
Smith (10) Patent No.: US 10,743,561 B2
(45) Date of Patent: Aug. 18, 2020

(54) APPARATUS AND METHOD FOR MAKING A FROZEN CONFECTIONARY PRODUCT

(71) Applicant: Bradley Smith, Ashford (GB)

(72) Inventor: Bradley Smith, Ashford (GB)

( * ) Notice: Subject to any disclaimer, the term of this patent is extended or adjusted under 35 U.S.C. 154(b) by 48 days.

(21) Appl. No.: 15/917,141

(22) Filed: Mar. 9, 2018

(65) Prior Publication Data

US 2018/0325140 A1 Nov. 15, 2018

Related U.S. Application Data

(62) Division of application No. 14/430,306, filed as application No. PCT/GB2013/052478 on Sep. 23, 2013, now abandoned.

(30) Foreign Application Priority Data

Sep. 21, 2012 (GB) .................................. 1216945.4

(51) Int. Cl.
| | |
|---|---|
| *A23G 9/00* | (2006.01) |
| *A23G 9/10* | (2006.01) |
| *A23G 9/22* | (2006.01) |
| *A23G 9/20* | (2006.01) |
| *A23G 9/06* | (2006.01) |
| *A23G 9/46* | (2006.01) |

(52) U.S. Cl.
CPC ............... *A23G 9/106* (2013.01); *A23G 9/06* (2013.01); *A23G 9/20* (2013.01); *A23G 9/224* (2013.01); *A23G 9/46* (2013.01)

(58) Field of Classification Search
CPC . A23G 9/06; A23G 9/106; A23G 9/20; A23G 9/224; A23G 9/46
See application file for complete search history.

(56) References Cited

U.S. PATENT DOCUMENTS

| | | | | |
|---|---|---|---|---|
| 4,701,054 A | * | 10/1987 | Cipelletti | ............... A23G 9/224 165/94 |
| 2006/0110515 A1 | | 5/2006 | Waletzko et al. | |
| 2011/0000229 A1 | * | 1/2011 | Boekhoorn | ............ A47J 31/402 62/56 |

FOREIGN PATENT DOCUMENTS

| | | |
|---|---|---|
| AU | 0561821 | 5/1987 |
| FR | 718289 A | 1/1932 |
| WO | 9500808 A1 | 1/1995 |
| WO | 2011131297 A1 | 10/2011 |

\* cited by examiner

*Primary Examiner* — Anshu Bhatia
(74) *Attorney, Agent, or Firm* — Oppenhuizen Law PLC; David L. Oppenhuizen (57) ABSTRACT

The invention relates to apparatus and method of making a frozen confectionary product such as ice cream or sorbet in which a confectionary mix is churned in a vessel whilst a liquid gas such as liquid nitrogen is added. Existing churning apparatus moves a stirrer through the ice cream mix in an epicyclical motion. This tends to splash liquid nitrogen so that it evaporates without contributing to the freezing of the ice cream. In the improved mixing method, the stirrer is repeatedly drawn against the inside wall(s) of the vessel. This reduces splashing of the liquid nitrogen. The drawing action also removes build up of frozen confectionary product on both the stirrer and the vessel walls and allows unfrozen confectionary mix to move to the edges of the vessel and be preferentially frozen.

7 Claims, 12 Drawing Sheets

APPARATUS AND METHOD FOR MAKING A FROZEN CONFECTIONARY PRODUCT

This application is a divisional application of co-pending U.S. application Ser. No. 14/430,306, filed Mar. 23, 2015, which is a National Stage of International Patent Application No. PCT/GB2013/052478, filed Sep. 23, 2013, which claims foreign priority to British Patent Application No. 1216945.4, filed Sep. 21, 2012.

The present invention relates to apparatus and method for making a frozen confectionary product.

U.S. Pat. No. 7,754,266 describes a method of making ice cream in which liquid nitrogen is added to an unfrozen ice cream mix whilst being churned. The ice cream is made in situ within a paper cup.

Liquid gas cannot be added into the bulk of the ice cream mix as the resulting rapid expansion of gas causes the ice cream mix to be projected out of the cup. Consequently, liquid gas is poured on top of the ice cream mix, freezing its upper surface only. A centrifugal action from the rotation of the vessel forces the liquid-gas outwardly. This causes a build up of hard frozen ice-cream around the inside wall of the cup.

The ice cream tends to freeze preferentially onto the mixing instrument. This clogging results in the frozen mix being moved around the cup on the mixing instrument rather than being mixed.

The epicyclic motion of the mixing instrument tends to splash liquid nitrogen sitting on the surface of the ice cream mix. A significant proportion of the splashed liquid gas is wasted as it evaporates away from the ice cream mix without contributing to the freezing process.

According to a first aspect of the invention there is provided a method of making a frozen confectionary product in which an unfrozen confectionary mix, agitated within a vessel, is cooled and frozen by a liquid gas; wherein an agitator agitating the mix has a motion which comprises repeatedly drawing the agitator substantially against an inside wall of the vessel.

The invention is particularly beneficial in the manufacture of personal sized portions of confectionary mixture as it significantly reduces the amount of splashing of both liquid gas and confectionary mix. Additionally, the contact between the agitator and the vessel removes build up of frozen mix on both parts thereby allowing: unfrozen mix to move to the edges of the vessel and be preferentially frozen, and reducing the likelihood of mix clogging onto the agitator.

It is preferred that the motion comprises repeatedly drawing the agitator substantially against a side wall of the vessel.

It is preferred that the agitator is moved relative to the vessel in order to contact the vessel wall, however it may be possible to move the vessel to the agitator, or both the agitator and vessel in order to achieve the same effect.

Preferably the vessel is rotated in order that a subsequent motion causes the agitator to draw against a different portion of the inside wall of the vessel. In this preferred method, substantially all of the circumference of the inside wall is scraped by the agitator.

It is preferred that the agitator is drawn downwardly against the side wall of the vessel towards the base of the vessel. Preferably contact of the agitator and the vessel's inside wall starts above or substantially near the surface of the confectionary mix, and the agitator then drawn downwardly through the confectionary mix.

In order to increase the amount of mixing, it is preferred that the motion comprises an opposing movement in which the agitator moves away from the inside wall of the vessel.

Preferably this is combined with an upward movement in order to bring the agitator out from the confectionary mix.

The supply of liquid gas in the apparatus described in U.S. Pat. No. 7,754,266 comprises a dewar vessel 6 having an outlet at its bottom and a valve 10, having a relatively large thermal mass, for controlling the flow of liquid gas through the outlet under gravity. Each time valve 10 is opened, the liquid gas the first portion of fluid will cool the valve 10 down to temperature. A portion of the liquid is wasted as it evaporates during cooling of the valve 10. This also creates a delay in the supply of liquid gas to the vessel until the valve has cooled sufficiently.

According to a second aspect of the invention there is provided a reservoir for holding a liquid gas the reservoir having:
  an outlet for allowing liquid gas to flow out from the reservoir;
  a valve, having a valve body, to control the flow of fluid through the outlet, the valve body being located within the reservoir so that when the reservoir is filled at least one outer surface in contact with liquid gas within the reservoir.

Because the valve body is located within the reservoir, in contact with the liquid gas, the valve body is cooled down substantially to the temperature of the liquid gas. When it is required to dispense an amount of liquid gas from the reservoir, none of the dispensed liquid is wasted through cooling of the valve body. As well as reducing waste of liquid gas, it also reduces the delay between opening the valve and liquid gas being dispensed to the confectionary mix.

It is preferred that the valve body is arranged to be at least partly submerged in the liquid gas.

The invention will now be described by example with reference to the following figures in which.

Figure 1:
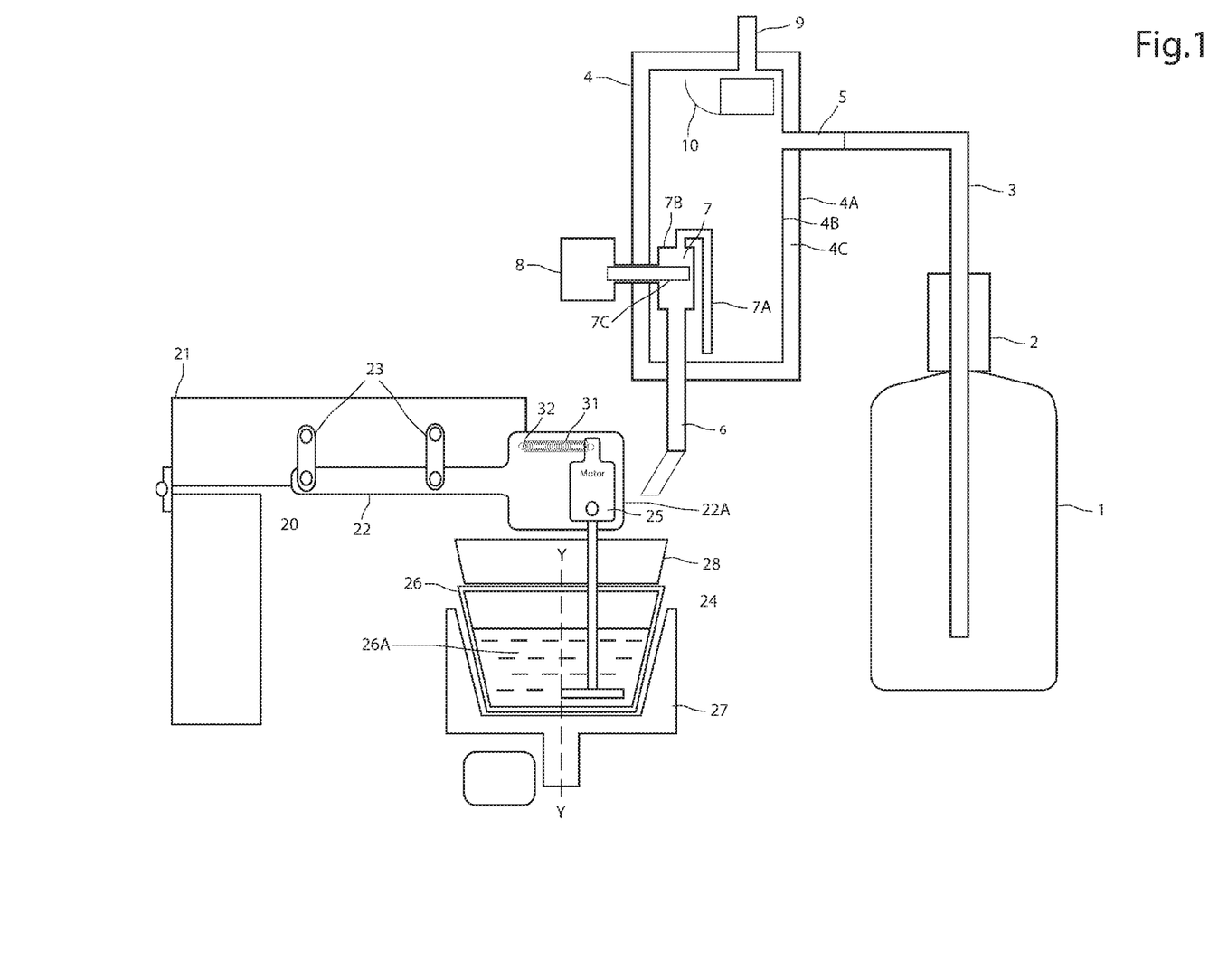
FIG. 1 is a schematic of apparatus for manufacturing a frozen confectionary product.

Referring to FIG. 1 there is illustrated schematically, apparatus for making a frozen confectionary product, such as ice cream. In overview, the apparatus comprises a paper cup 26 (or other vessel) for holding a single portion of confection mix 26A and a mixer 20 having a mixing element 24 for mixing the confection mix within the cup 26 and means to supply a liquid gas into the cup 26 to freeze the confectionary mix. In detail, there is shown a dewer 1 holding a supply of liquid gas, commonly liquid nitrogen, a pump 2 for pressurizing the liquid gas within the dewer 1, a thermally insulated conduit 3 for carrying liquid gas under pressure from the dewer 1 to a reservoir 4. The reservoir 4 comprises a thermally insulated container. In this instance the reservoir 4 comprises nested walls 4A, 4B, the cavity 4C therebetween being partially evacuated. The reservoir 4 comprise an inlet 5 for receiving liquid gas from dewar 1, and a thermally insulated conduit 6 passing through walls 4A, 4B forming an outlet. Conduit 6 guides flow of the liquid gas from the reservoir 4 to mixing cup 26. In this example the conduit 6 passes through lower portion of walls 4A, 4B, though in alternative embodiments it may pass through an upper portion.

Within the reservoir cavity formed within wall 4B sits a valve 7 comprising an inlet conduit 7A, valve casing 7B and valve element 7C operated by a solenoid mechanism 8. A further opening is formed in upper portions of walls 4A, 4B which provides an air vent 9. The vent may be opened or closed by a float valve 10.

In operation liquid gas pressurised within dewar 1 flows along conduit 3 into and fills reservoir 4. The vent 9, which is open during the filling process, allows evaporated liquid gas to escape from the reservoir cavity 4. This is particularly important at the start of the filling process because a substantial volume of gas will be generated as the inner wall 4B and the valve 7 are cooled to the temperate of the liquid gas. Filling of the reservoir 4 continues until the pressure within the reservoir substantially equals that of the liquid gas flowing from dewar 1.

When it is wished to dispense liquid gas from the reservoir 4, solenoid mechanism 8, which lies at least partly outside of the reservoir cavity, is activated moving valve element 7C to allow a flow of liquid gas under pressure through outlet 6. Because the liquid gas flows under a pressure greater than gravity, it is possible to have the outlet of the reservoir 4 formed in an upper part of the reservoir 4, or/and for the outlet of conduit 6 to be located above reservoir 4. This may be particularly advantageous where it is required that the reservoir 4 be held below the vessel 26.

Valve 10 may also be periodically opened (manually or otherwise) to allow venting of gas, such as may be required if liquid gas is held within the reservoir 4 for a time.

Mixer 20 comprises stand 21 which carries a cantilevered arm 22. Arm 22 is carried by stand 21 via a linking mechanism 23 allowing arm 22 to rotate relative to stand 21. Mounted onto the free end 22A of arm 22 is an agitating assembly comprising an agitation element 24 and motor assembly 25.

In an operating position, arm head 22A sits above vessel 26 so that the agitation element 24 extends into the vessel 26. The vessel 26 is supported on a motorised support 27 that in operation causes the vessel 26 to rotate about a vertical axis as viewed in FIG. 1 passing substantially through the centre of the cup 26.

Figure 2:
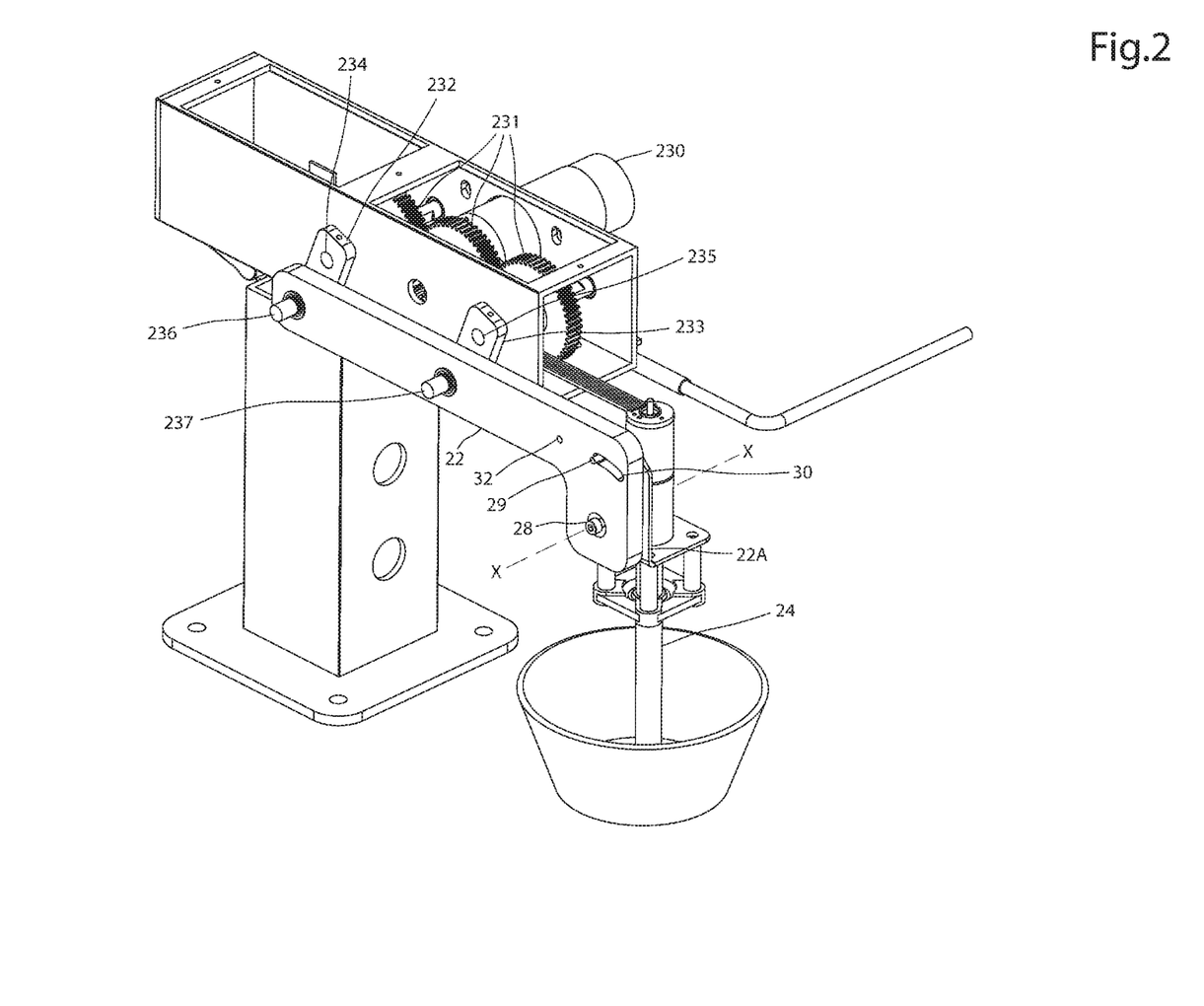
FIG. 2 is a perspective view of the mixer and vessel of FIG. 1.

As shown in FIG. 2, the agitating assembly is mounted onto arm head 22A about pivot 28 which allows the agitating assembly to rotate relative to arm 22 about an axis X-X. The extent of rotation is restricted by a stop 29 provided on the agitating assembly that passes through a slot 30 of the arm. A spring 31 (see FIGS. 1 and 4A) is attached between stop 29 and an anchor 32 on the arm 22. The spring 31 acts to bias the agitating element 24 towards a substantially vertical orientation.

Figure 3:
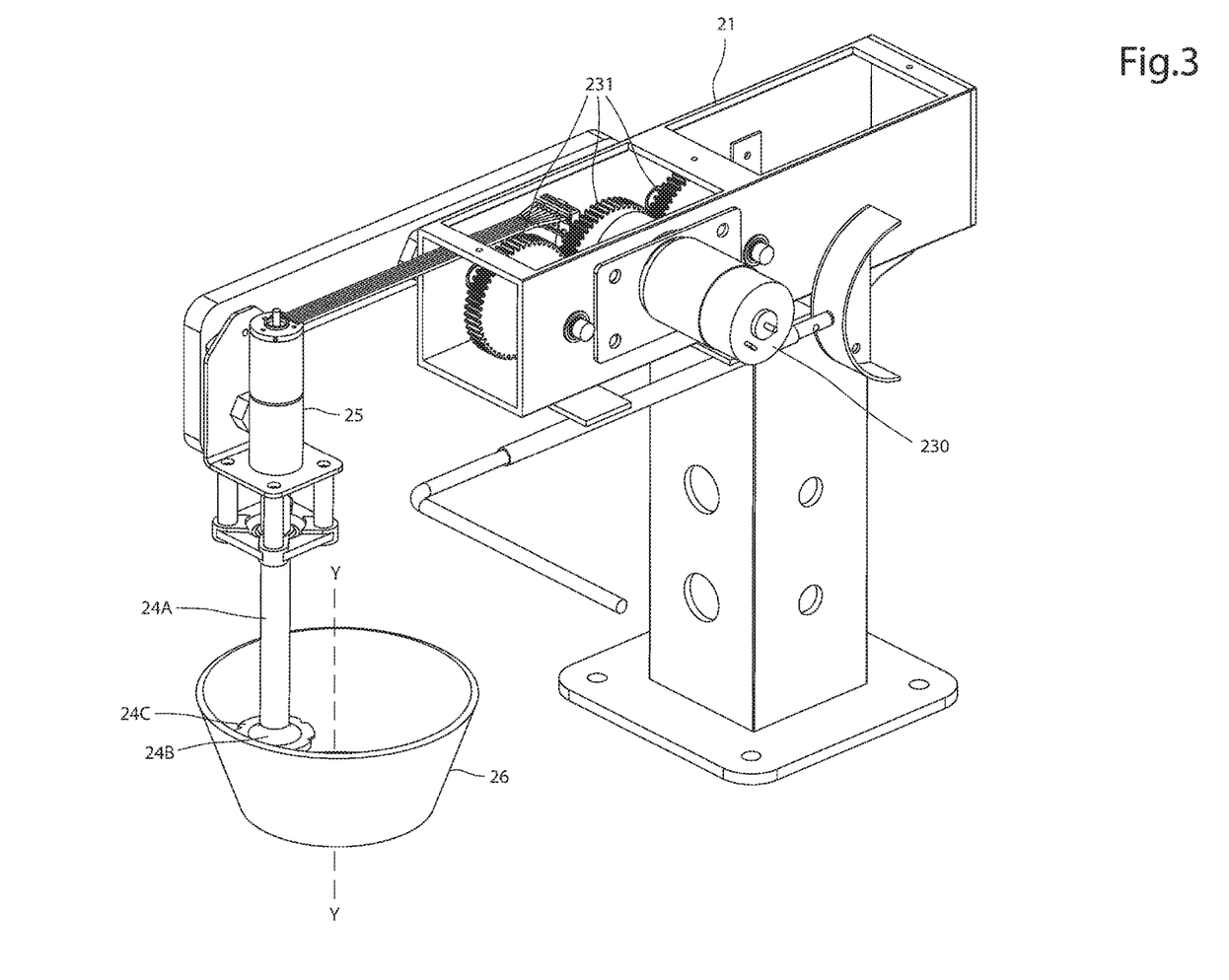
FIG. 3 is a further perspective view of the mixer and vessel of FIG. 1.

As seen best in FIG. 3, the end of the agitating element 24 comprises an elongate portion 24A terminating with an enlarged head 24B having a serrated outer edge 24C to assist removal of frozen confection product from the walls of the vessel 26. The motor 25, when in operation, causes the agitation element 24 to rotate about an axis running substantially through the length of the elongate portion 24A As illustrated in FIGS. 2 and 3 movement of the arm is effected by a motor 230 mounted onto supporter 21. Through a gearing mechanism 231 operation of the motor 230 turns radial arms 232, 233 in like directions about pivot points 234, 235 located towards at one end of each radial arm 232, 233. Pins 236, 237 located towards the other end of the radial arms 232, 233 provide pivotal mountings for arm 22.

When motor 230 operates, the linking mechanism 23 provides a motion to the agitating element 24 described below and illustrated in FIGS. 4A-4H.

Figure 4A:
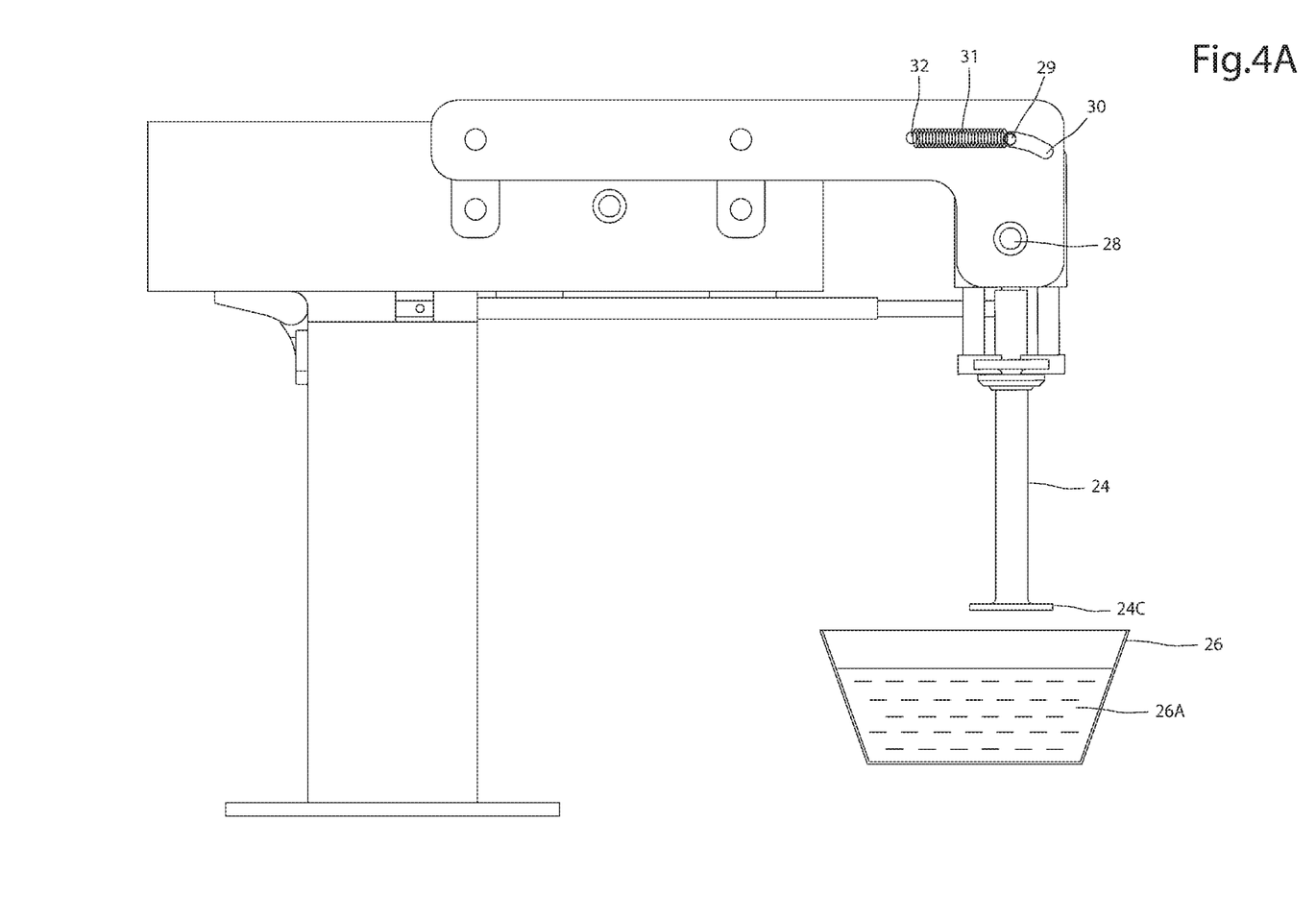
FIGS. 4A-4H are side elevations of a mixer and vessel illustrating the motion of the agitator during mixing.
Figure 4B:
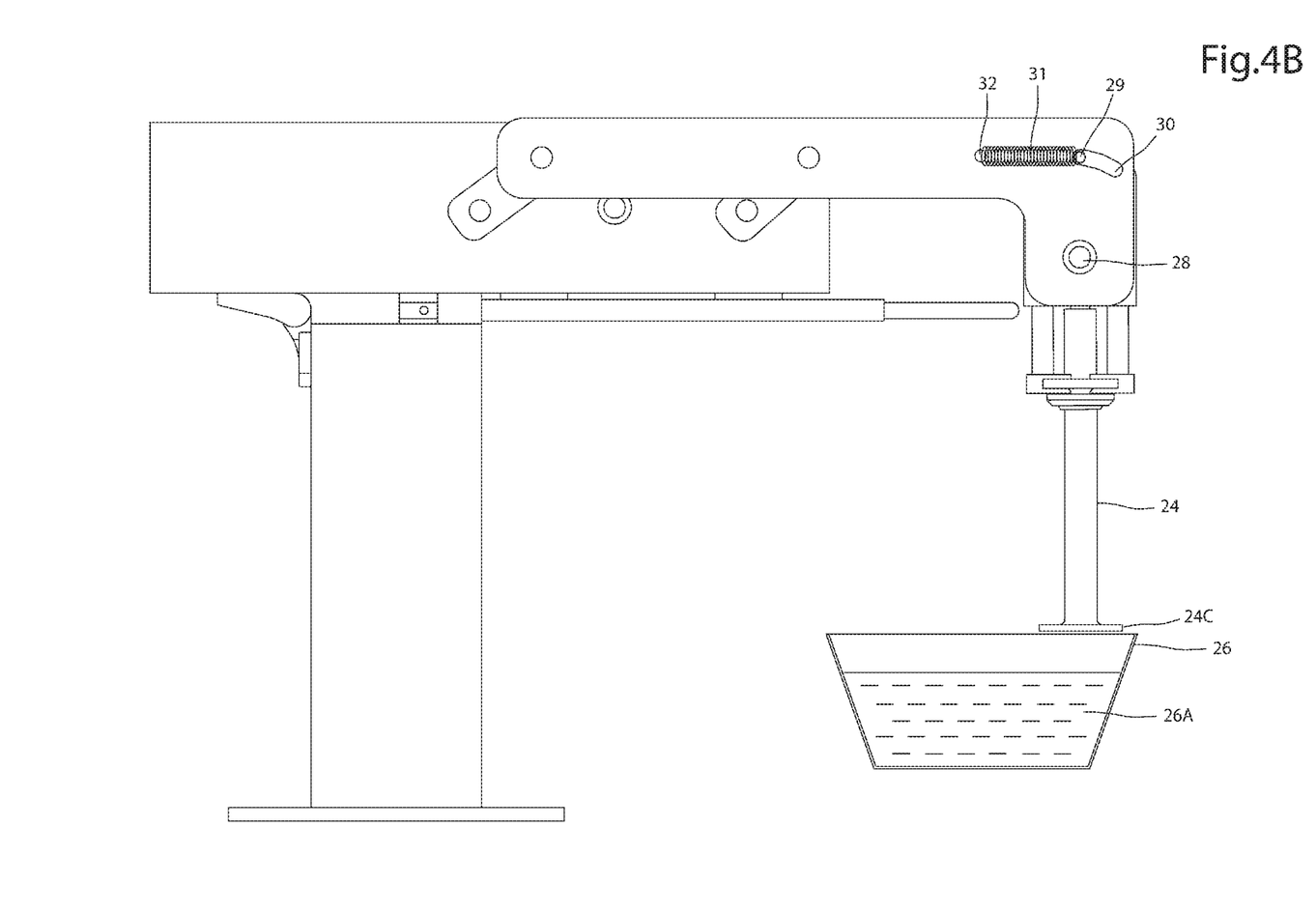
Figure 4C:
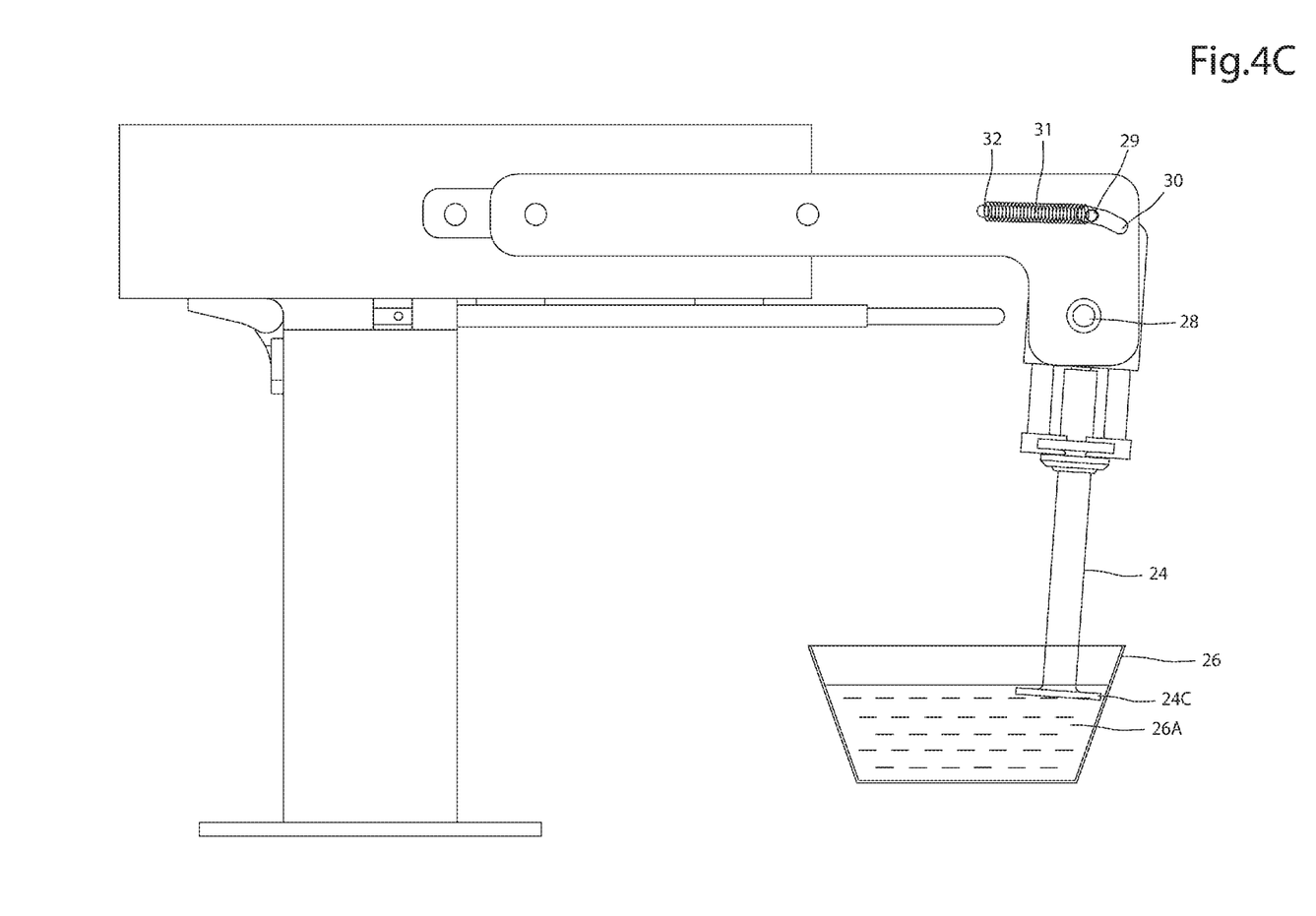
Figure 4D:
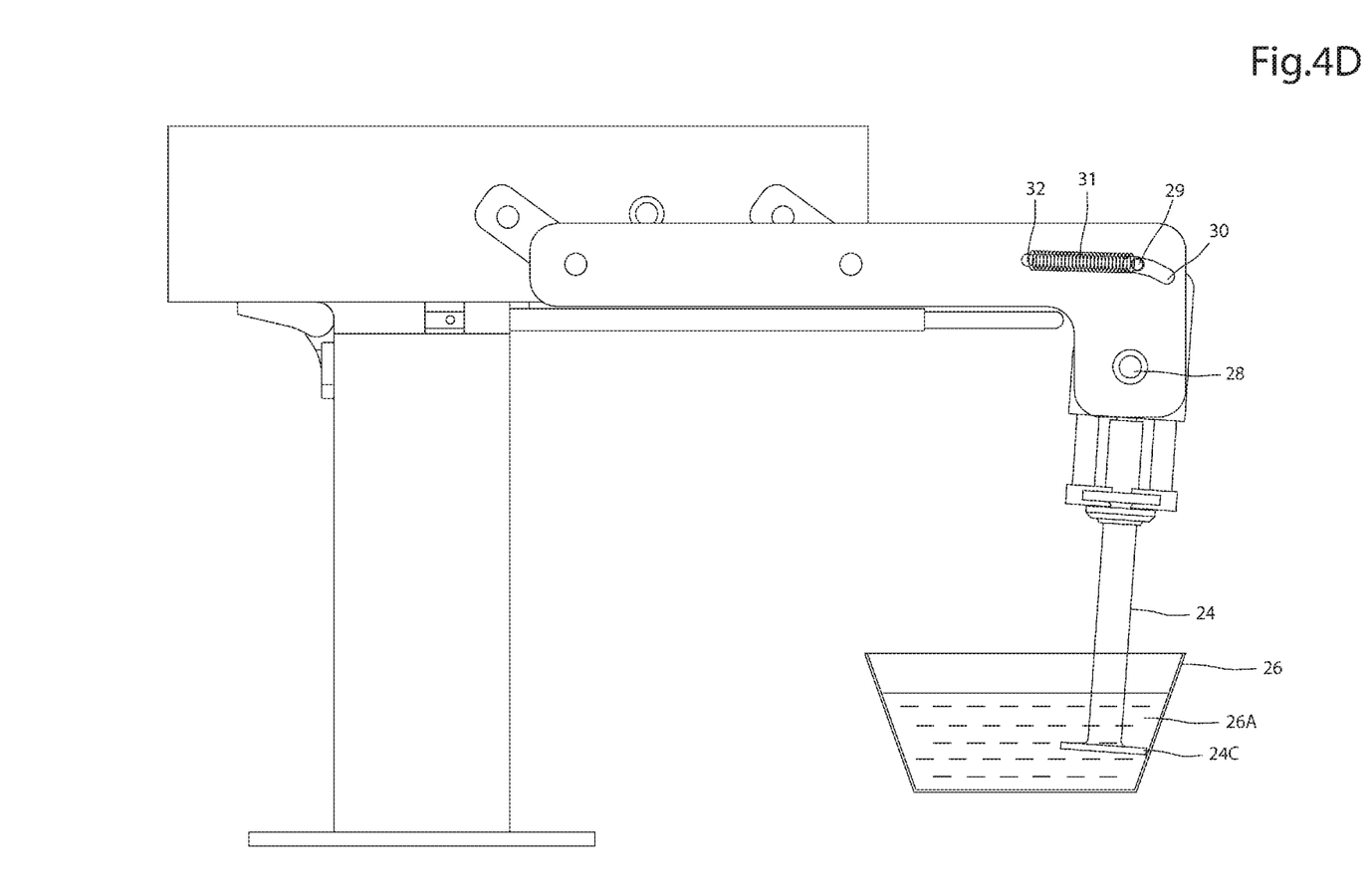
Figure 4E:
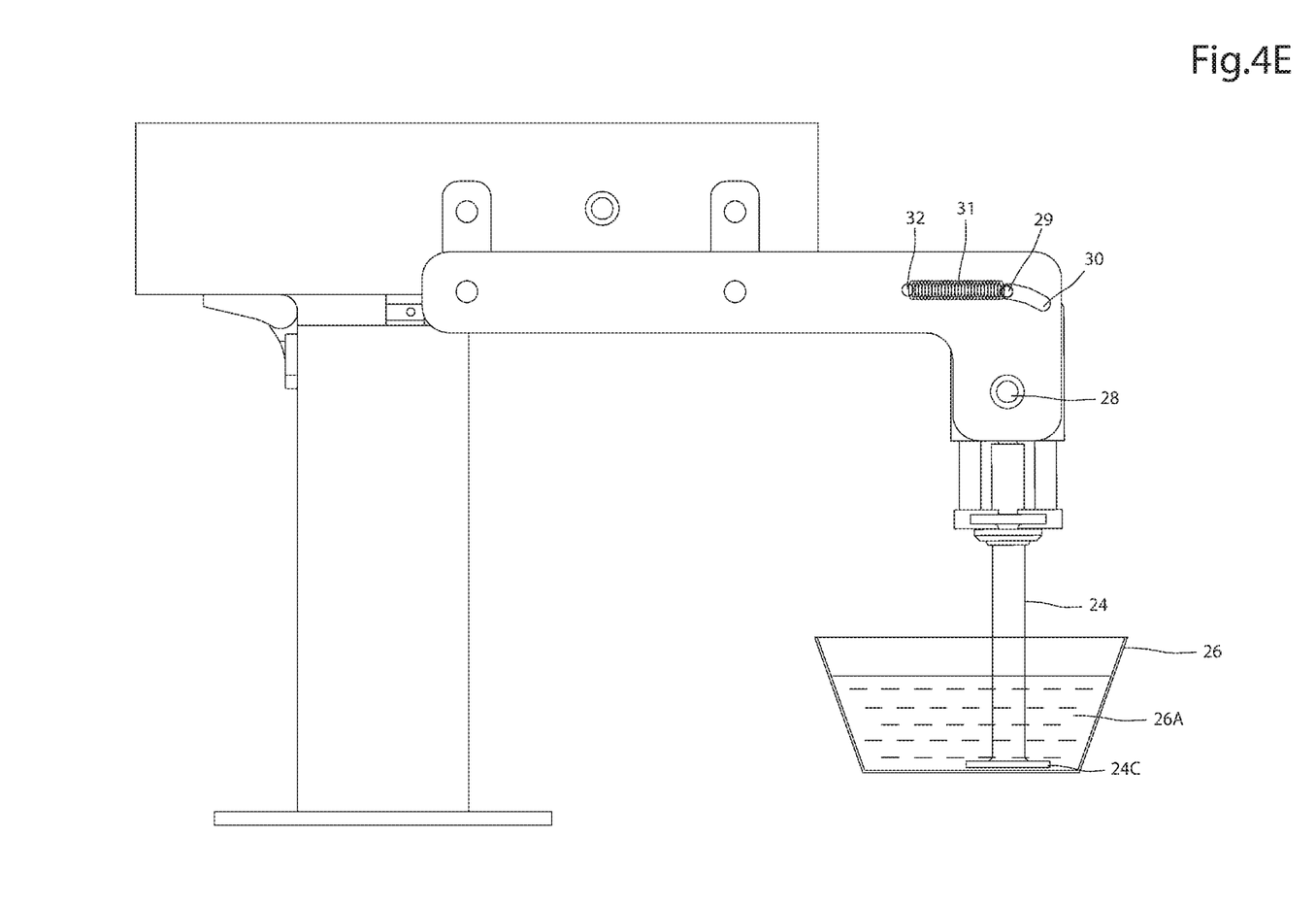
Figure 4F:
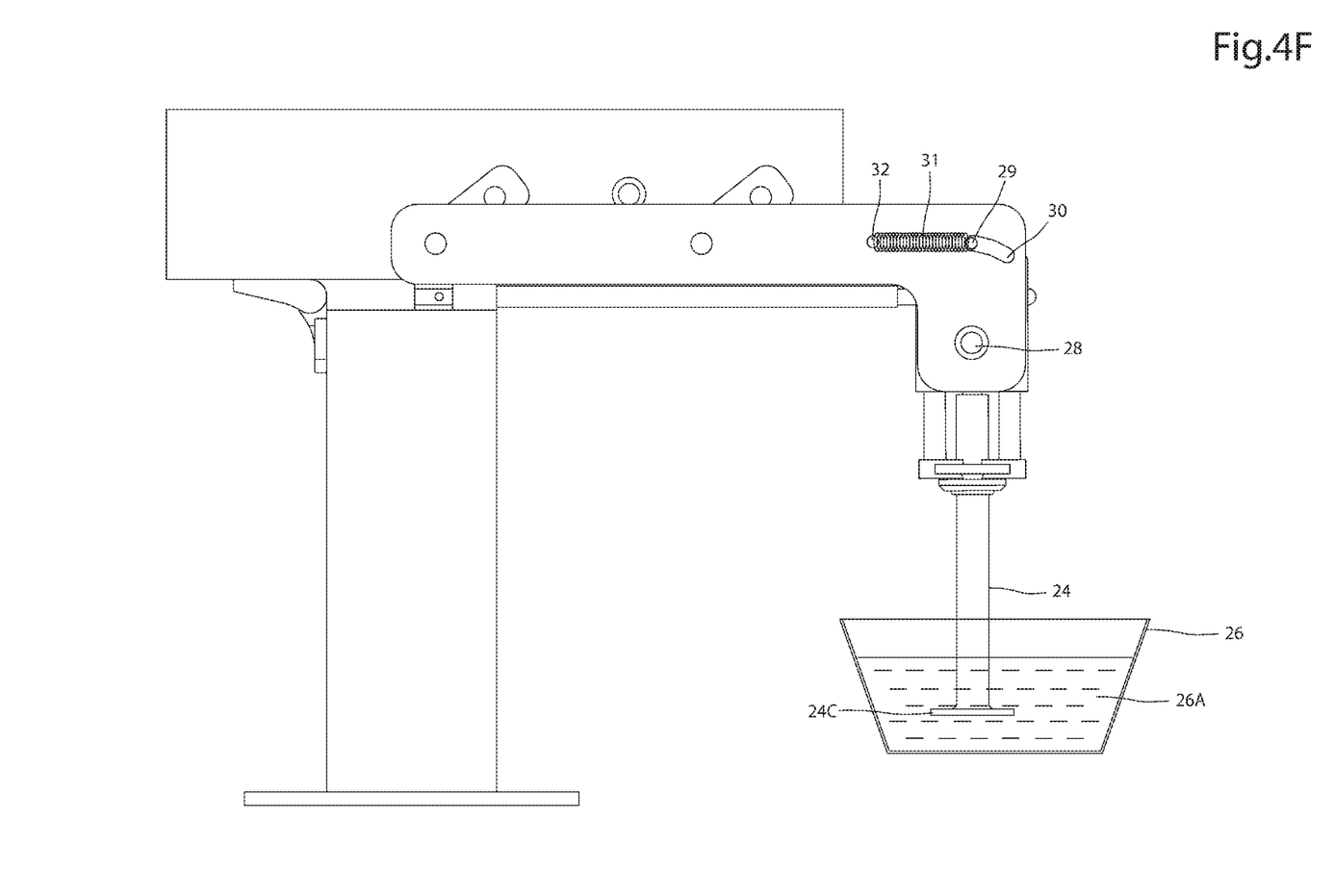
Figure 4G:
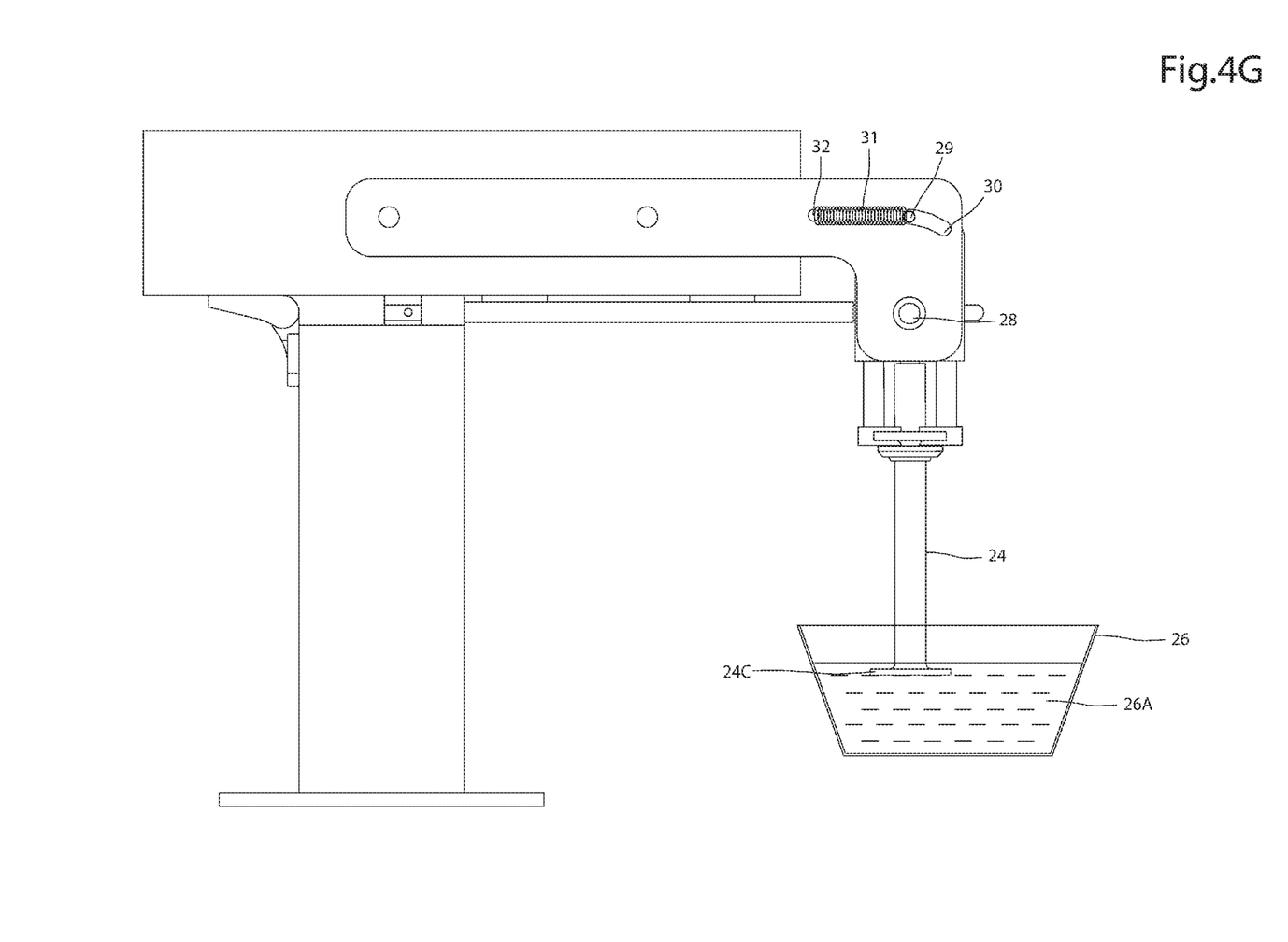
Figure 4H:
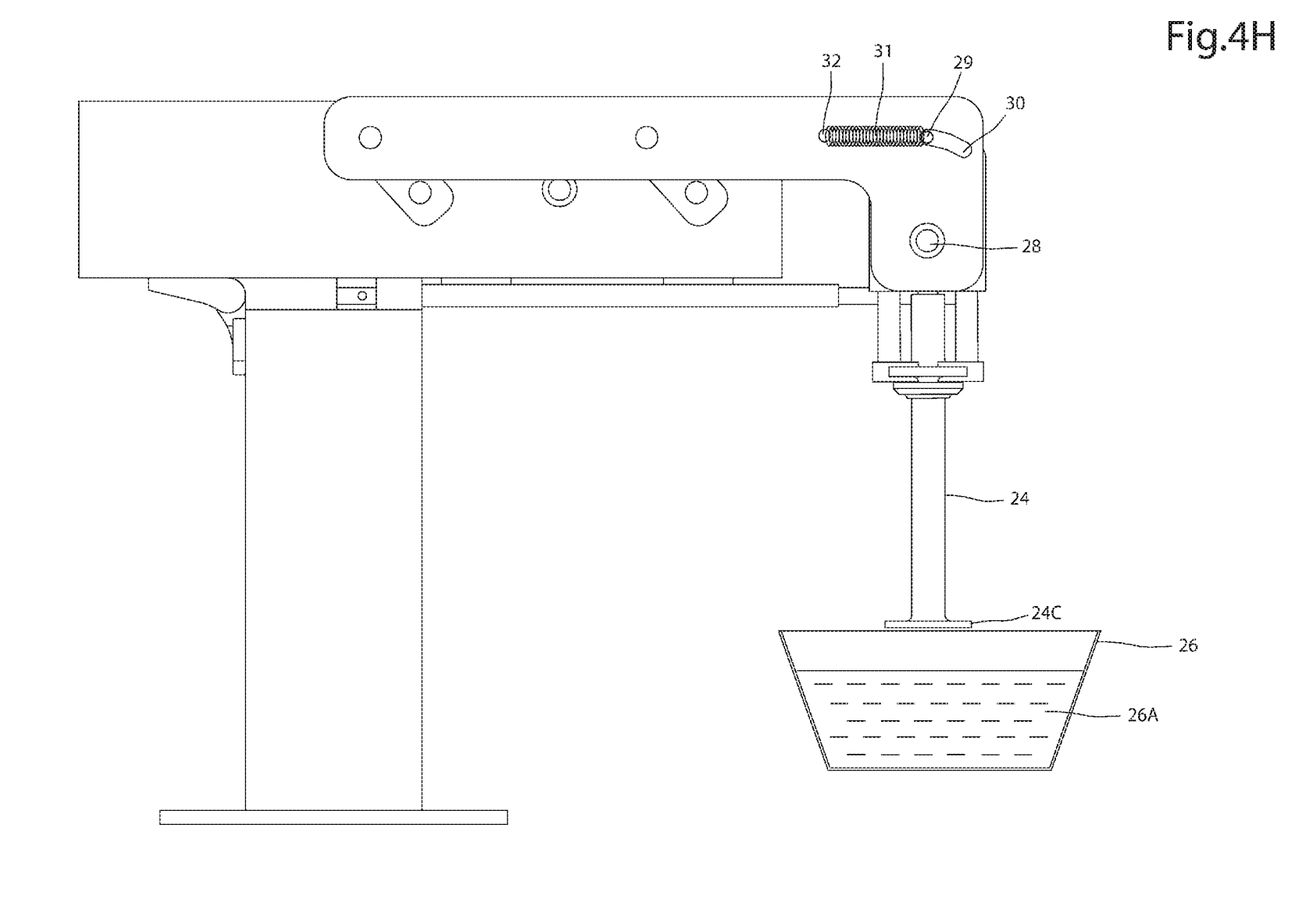

From the initial position illustrated in FIG. 4A, rotation of the two radial arms of the linking mechanism causes the agitating element 24 to move downwards and towards the right hand side of the cup 26 as viewed in FIG. 4B until it makes contact with the inside wall of cup 26. Further movement of arm 22 to the right causes the agitating element assembly to rotate about pivot 28 so that agitating element 24 maintains contact with inner wall FIGS. 4C, 4D as the agitator moves downwards towards the base of the vessel 26. This scrapes solidified (frozen) confectionary mix 26A which preferentially forms on the edges of the cup 26, and the upper surface of the vessel 26 and pushes it down towards the bottom of the vessel 26. Once at or towards the base of the cup 26, the agitating element 24 moves away from the wall towards the centre of the cup 26 and simultaneous upwards thereby dragging with it, with the aid of the flange of broaden head 24B, unfrozen confectionary mix 26A to the surface (FIG. 4E, 4F). Once the agitation element 24 loses contact with the wall of cup 26, spring 31 causes the agitation assembly to assume its original orientation. The agitation element 24 is lifted out of the confectionary mix to it original position shown in FIG. 4A. The above movements all occur in a single vertical plane.

In order that ice cream is scraped from substantially all surfaces of the cup 26, the cup 26 is caused to rotate about axis Y-Y (see FIG. 3). Scraping of the ice cream from the surface of the vessel is assisted through the rotation of agitating element 24 about it primary axis.

The upstanding wall of a paper cup 26 is commonly formed from a single sheet of paper product which is curved with one edge overlapping and joined (usually glued) to an opposite edge. To ensure that this rotation does not cause damage to this join, the rotational direction of the agitating element 24 is selected to ensure that the edge of the agitation would first contact the upper (furthest inward) edge forming the join.

To make an ice cream product, unfrozen ice-cream mix 26A is placed into a paper cup 26 and mounted onto motorised support 27. Valve 7 is opened to allow a portion of liquid gas to be poured into the cup 26 onto the ice cream mix.

Motors 230, 25 and 27 which are linked to (and controlled by) a control unit (not shown) are switched on so as to cause arm 22, agitation element 24 and cup 26 to rotate.

The cup 26 may be provided with a removable splash ring 28 (see FIG. 1) shaped to sit against an upper part of the inside wall of vessel 26 and extend above the lip of vessel 26. Splash ring 28 reduces the incidence of spillage of confectionary mix or liquid gas out from the cup 26 during mixing, it also reduces/prevents said spillage onto the upper portion of the vessel. This is beneficial where the ice cream mix is consumed directed from the cup 26 as it provides a clean inner rim which makes the cup (with product) look more aesthetically pleasing.

Although it is preferred that the vessel 26 is a paper cup or other disposable or once time item, it may take other forms, e.g. comprised from plastic or metal and may be washed and reused.

Rather than using spring 31 other forms of biasing means may be used, for example, the agitating element may be formed, in part or whole, from a resiliently flexible material arranged to resiliently flex when the agitating element contacts the vessel wall.

The agitating element could take other forms, e.g. such as any of the mixing element commonly used with food mixers. Further it could take the form of a spoon like element and be replaceable/disposable, e.g. used as a one time piece which is then used to consume the product.

Although it is generally expected that the liquid gas is poured into the vessel, in other embodiments, the liquid gas may poured or otherwise directed around the outside of the vessel wall. The agitation element can still function as before, scraping frozen mix from the inside wall of the vessel and mixing it in with the reset of the unfrozen product.

Any other suitable liquid gas may be used instead of liquid nitrogen.

Although in the above example the agitating element is caused to move relative to the vessel, in an alternative embodiment the vessel may be caused instead to move relative to the agitator. Further alternatively, the relative movement may be achieved through movement of both agitator and vessel.

In alternative embodiments, the reservoir 4 may be omitted such that liquid gas flows directly from the dewar 1 via a conduit to the vessel 26 under control of a valve.

Figure 5:
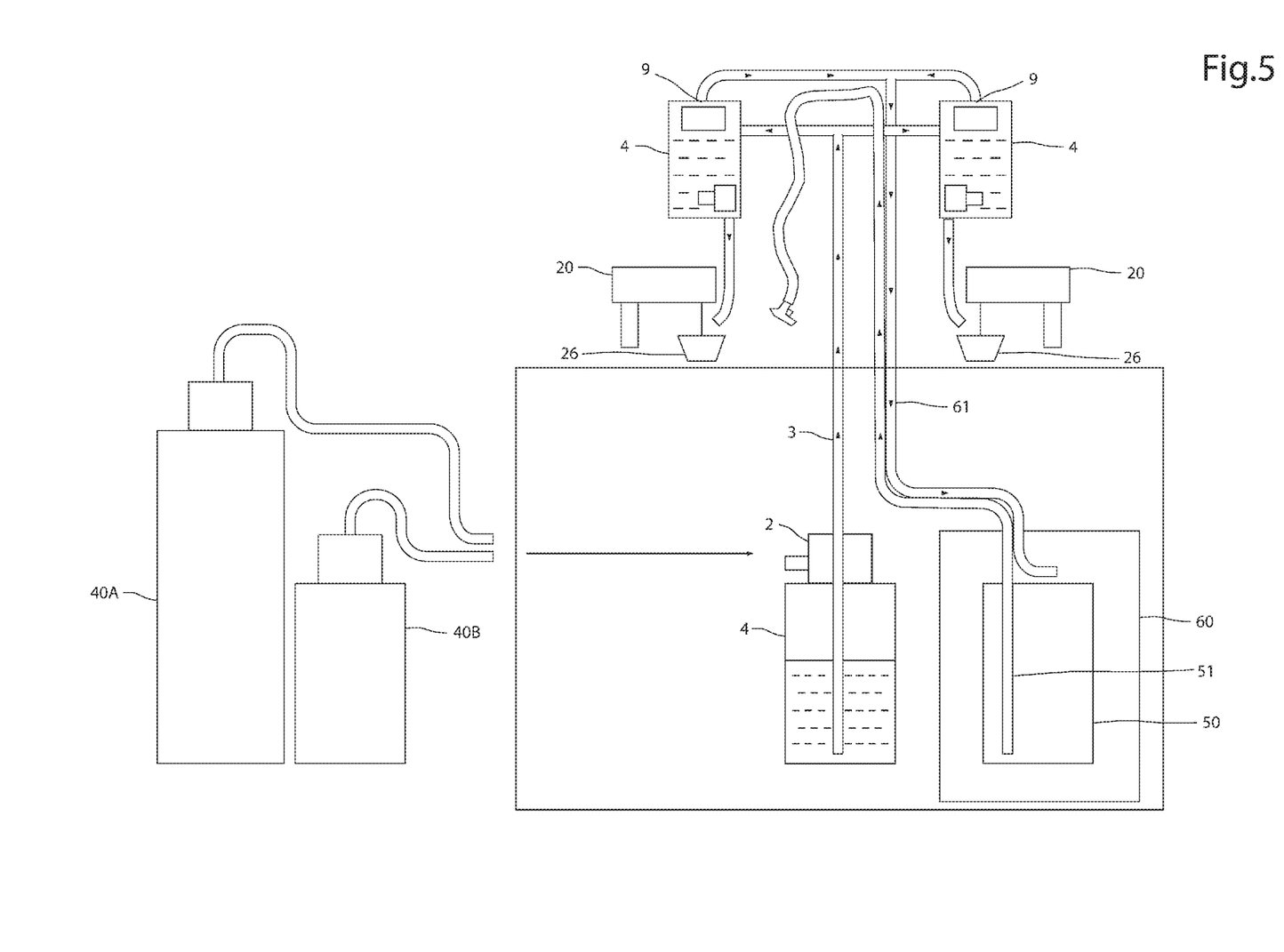
FIG. 5 is a schematic of apparatus for manufacturing a frozen confectionary product which includes multiple mixers.

FIG. 5 illustrates an ice cream cart incorporating the above described apparatus. Like parts will be given like numbers. The cart may be motorised or otherwise. Dewer 4 feeds liquid gas via conduit 3 to two reservoirs 4 serving two mixers 20 and corresponding vessels 26 which sit on a work surface on top of the cart. In order to allow multiple servings confectionary product serving to made simultaneously. Dewer 4, which is carried in the cart is sized to supply sufficient volume of liquid gas as is expected for a days trading. It can be refilled at the beginning/end of the day by larger commercial vessels 40A 40B.

Also held within the cart is a refrigerated keg storing unfrozen confectionary mix. A pipe 51 carries pumped mix from the keg 50 for dispensing into cups 26. Control of the flow of mix through pipe 51 is provided by a valve, in the form of a hand held trigger tap at the free end of the pipe 51. Keg 51 is held within a refrigerated chamber 60. The chilling of chamber 60 is provided by piping cold vented gas which has evaporated in reservoirs 4 and passed out of vents 9, via conduit 61 into chamber 60.

Many variations are possible without departing from the scope of the present invention as defined in the appended claims.

I claim:

1. A method of making a frozen confectionary product in which an unfrozen confectionary mix, agitated within a vessel, is cooled and frozen by a liquid gas:
    characterised in that an agitator agitates the mix with a cyclic motion comprising:
    a downward movement through the confectionary mix towards the base of the vessel which moves frozen confectionary mix from an inner surface of the vessel towards the base of the vessel; and
    an upward movement which moves unfrozen confectionary mix towards the surface of the confectionary mix;
    the cyclic motion also including a transversal movement towards and away from the wall of the vessel
    the vessel being rotated with respect to the agitator about an axis running substantially through the length of the agitator;
    the axis of the cyclic motion of the agitator being perpendicular to the axis running substantially through the length of the agitator such that the upward and downward movements do not occur within the same part within the vessel.

2. A method according to claim 1 wherein the cyclic motion comprises:
    a downward movement running proximate to an inside wall of the vessel; and
    that during the upward movement the agitator runs nearer the centre of the vessel as compared with the downward movement.

3. A method according to claim 2 wherein in the downward movement the agitator contacts the inside wall of the vessel.

4. A method according to claim 1 wherein the agitator also rotates about its primary axis.

5. Apparatus for making a frozen confectionary product comprising: an agitator driven to agitate a confectionary mix within a vessel, the agitator configured to mix the confectionary mix with a cyclic motion according to claim 1 and to rotate the vessel with respect to the agitator.

6. Apparatus according to claim 5 where there is provided a dewar to supply a liquid-gas to cool and freeze the confectionary mix within the vessel, wherein the agitator is driven to be repeatedly drawn against an inner wall of the vessel.

7. Apparatus according to claim 5 for making a single portion of a frozen confectionary product.

* * * * *